United States Patent
Friggeri et al.

(10) Patent No.: US 10,521,732 B2
(45) Date of Patent: Dec. 31, 2019

(54) SYSTEMS AND METHODS FOR CONTENT PRESENTATION

(71) Applicant: Facebook, Inc., Menlo Park, CA (US)

(72) Inventors: Adrien Thomas Friggeri, San Francisco, CA (US); Brady John Brayley Voss, Duvall, WA (US); James Glessal Pearce, Palo Alto, CA (US); Spencer G. Ahrens, Redwood City, CA (US); Ismail Onur Filiz, El Cerrito, CA (US); Paul Alexander Dow, Redwood City, CA (US); James Dylan Karraker, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 1019 days.

(21) Appl. No.: 14/981,749

(22) Filed: Dec. 28, 2015

(65) Prior Publication Data
US 2017/0185912 A1    Jun. 29, 2017

(51) Int. Cl.
| G06N 20/00 | (2019.01) |
| H04L 12/58 | (2006.01) |
| H04L 29/08 | (2006.01) |
| G06F 16/2457 | (2019.01) |
| H04L 29/06 | (2006.01) |
| H04W 4/21 | (2018.01) |

(52) U.S. Cl.
CPC ....... *G06N 20/00* (2019.01); *G06F 16/24578* (2019.01); *H04L 51/32* (2013.01); *H04L 67/02* (2013.01); *H04L 67/26* (2013.01); *H04L 69/28* (2013.01); *H04W 4/21* (2018.02)

(58) Field of Classification Search
CPC ....................................... G06N 20/00
USPC ........................................... 706/12
See application file for complete search history.

(56) References Cited

U.S. PATENT DOCUMENTS

| 2014/0351257 A1* | 11/2014 | Zuzik | H04L 67/10 707/740 |
| 2015/0095329 A1* | 4/2015 | Sanio | G06F 16/48 707/732 |
| 2015/0302043 A1* | 10/2015 | Park | G06F 16/40 707/694 |
| 2016/0188153 A1* | 6/2016 | Lerner | G06F 3/0488 709/206 |

* cited by examiner

*Primary Examiner* — Hien D Khuu
(74) *Attorney, Agent, or Firm* — Sheppard Mullin Richter & Hampton LLP

(57) ABSTRACT

Systems, methods, and non-transitory computer-readable media can obtain a plurality of content items that are available to be presented in a content feed of a first user, wherein each content item has a corresponding lifespan that indicates when the content item expires and is no longer available for presentation. A content feed having at least a first content item from the plurality of content items can be provided to a computing device of the first user. A determination can be made that at least one second user has provided feedback for the first content item, the feedback indicating an up-vote or a down-vote of the first content item. The lifespan of the first content item can be adjusted based at least in part on the feedback.

20 Claims, 7 Drawing Sheets

SYSTEMS AND METHODS FOR CONTENT PRESENTATION

FIELD OF THE INVENTION

The present technology relates to the field of content presentation. More particularly, the present technology relates to techniques for presenting content items through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content provider platform (e.g., a social networking system). Users can operate their computing devices to access the content items through the platform. Typically, the content items can be provided, or uploaded, by various entities including, for example, content publishers and also users of the content provider platform.

SUMMARY

Various embodiments of the present disclosure can include systems, methods, and non-transitory computer readable media configured to obtain a plurality of content items that are available to be presented in a content feed of a first user, wherein each content item has a corresponding lifespan that indicates when the content item expires and is no longer available for presentation. A content feed having at least a first content item from the plurality of content items can be provided to a computing device of the first user. A determination can be made that at least one second user has provided feedback for the first content item, the feedback indicating an up-vote or a down-vote of the first content item. The lifespan of the first content item can be adjusted based at least in part on the feedback.

In an embodiment, the lifespan of the first content item is increased when the feedback indicates an up-vote.

In an embodiment, the lifespan of the first content item is decreased when the feedback indicates a down-vote.

In an embodiment, the systems, methods, and non-transitory computer readable media are configured to receive feedback for the first content item provided by the first user, the feedback indicating an up-vote or a down-vote of the first content item and cause the lifespan of the first content item to be adjusted based at least in part on the feedback from the first user.

In an embodiment, the systems, methods, and non-transitory computer readable media are configured to obtain a set of tags associated with the first content item, each tag describing subject matter in the first content item and determine a ranking for the first content item in the content feed of the first user based at least in part on the set of tags.

In an embodiment, the systems, methods, and non-transitory computer readable media are configured to train a model to be used for ranking content items based at least in part on (i) the set of tags and (ii) the feedback provided by the first user for the first content item.

In an embodiment, the systems, methods, and non-transitory computer readable media are configured to determine a second content item to be included in the content feed, obtain a set of tags associated with the second content item, each tag describing subject matter in the second content item, and determine a ranking for the second content item in the content feed of the first user using the trained model.

In an embodiment, the systems, methods, and non-transitory computer readable media are configured to determine that the lifespan of the first content item has expired and remove the first content item from the content feed.

In an embodiment, the systems, methods, and non-transitory computer readable media are configured to remove the first content item from a content feed corresponding to the second user.

In an embodiment, wherein an amount of adjustment to the lifespan of the first content item is based at least in part on a feedback history of the second user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
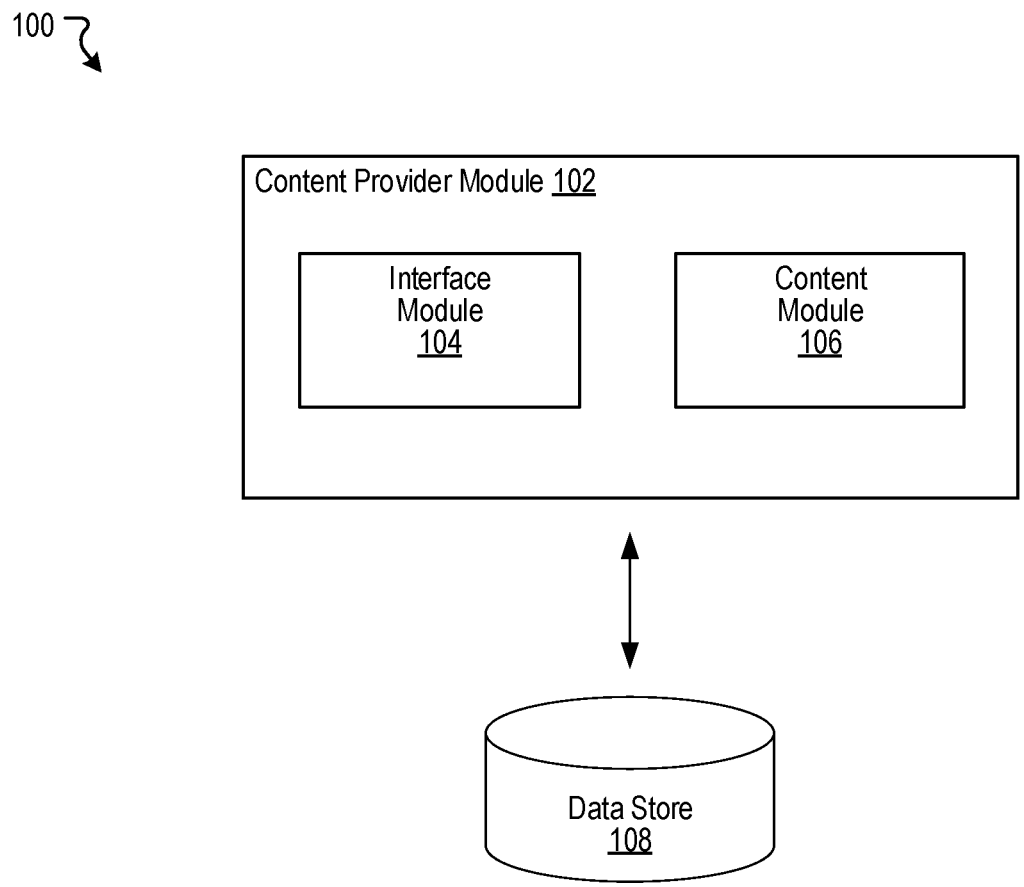
FIG. 1 illustrates an example system including an example content provider module configured to provide content to users, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Presentation

People use computing devices (or systems) for a wide variety of purposes. As mentioned, under conventional approaches, a user can utilize a computing device to share content items (e.g., documents, images, videos, audio, etc.) with other users. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

In some instances, a user operating a computing device can interact with a content provider interface (e.g., a software application running on the computing device, web browser, etc.) to access content items. Such content items, or snippets (e.g., title, summary, text excerpt, images, frames, etc.) of content items, can be presented through the interface as part of a content feed, for example. Users can navigate (e.g., browse) the content feed, for example, by scrolling or performing some gesture through a display screen of the computing device, to access the different content items that are available in the content feed. At any given time, there may be a large number of content items that are presented in a content feed. As such, it may be difficult for users to quickly determine which content items in the content feed are more popular, or of higher quality, than others. Conventional approaches may indicate the popularity of content items, for example, based on the number of users that have accessed or viewed a content item. Under such conventional approaches, both popular and unpopular content items are still presented to users along with their respective popularity metrics, thereby causing users to spend additional time and effort in determining whether a content item should or should not be accessed. Accordingly, such conventional approaches can be inconvenient to users and may not be effective in addressing these and other problems arising in computer technology.

An improved approach rooted in computer technology overcomes the foregoing and other disadvantages associated with conventional approaches specifically arising in the realm of computer technology. In various embodiments, content items can be associated with respective lifespans. For example, a lifespan of a content item can be a period of time (e.g., seconds, minutes, hours, days, time, date, or any other measurable unit of time) until the content item expires. In some embodiments, a content item that has expired will no longer be available for browsing, for example, through a content feed. Further, in such embodiments, the expired content item is removed from any content feeds in which it was previously included. In such embodiments, any content items included in a content feed are therefore "active" (i.e., not expired).

In various embodiments, the lifespan of a content item is initially set to a default period of time (e.g., 24 hours). In such embodiments, this lifespan may be increased or decreased, for example, based on the number of users that indicated their like or dislike of the content item. In some embodiments, users can indicate their like or dislike of a content item by selecting options to up-vote or down-vote the content item, respectively. Thus, the lifespan of a content item can increase with respect to the number of up-votes, or likes, received for the content item. Similarly, the lifespan of the content item can decrease with respect to the number of down-votes, or dislikes, received for the content item. Consequently, content items that are generally popular, or are liked, among users can continue to be available through the respective content feeds of users for longer periods of time. In contrast, content items that are generally unpopular, or are disliked, among the users will typically expire in shorter periods of time. Such an improved approach helps increase the number of popular, or higher quality, content items that are available through content feeds while eliminating, or reducing, the number of unpopular, or lower quality, content items from the content feed.

FIG. 1 illustrates an example system 100 including an example content provider module 102 configured to provide content to users, according to an embodiment of the present disclosure. As shown in the example of FIG. 1, the content provider module 102 can include an interface module 104 and a content module 106. In some instances, the example system 100 can include at least one data store 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. It should be understood that there can be many variations or other possibilities.

In some embodiments, the content provider module 102 can be configured to communicate and/or operate with the at least one data store 108 in the example system 100. The at least one data store 108 can be configured to store and maintain various types of data. In various embodiments, the at least one data store 108 can store data relevant to function and operation of the content provider module 102. One example of such data is content items that are available for access through the interface provided by the interface module 104 as well as the respective lifespans of such content items. In some implementations, the at least one data store 108 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 108 can store information associated with users, such as user identifiers, user information, profile information, user specified settings, content produced or posted by users, and various other types of user data. It should be appreciated that there can be many variations or other possibilities.

In various embodiments, the content provider module 102 can utilize the interface module 104 and the content module 106 to provide content items to users. The interface module 104 can be configured to provide an interface (e.g., graphical user interface) through which content items can be presented and accessed. For example, the interface can be provided through a software application running on a computing device being operated by a user. The user can interact with the interface, for example, by performing touch screen gestures through a display screen of the computing device. As mentioned, in some embodiments, content items can be presented through the interface as part of a content feed, which the user can navigate to access or browse content items. In various embodiments, content items can be associated with respective lifespans. For example, a lifespan of a content item can be represented as a period of time (e.g., seconds, minutes, hours, days, time, date, or any other measurable unit of time) until the content item expires. In some embodiments, a content item that has expired will no longer be available for browsing, for example, through a content feed. Further, in such embodiments, the expired content item is removed from any content feeds in which it was previously included. In various embodiments, the lifespan of a content item is initially set to a default period of time (e.g., 24 hours). In such embodiments, this lifespan may be increased or decreased, for example, based on the number of users that indicated their like or dislike of the content item. More details regarding the interface module 104 will be provided below in reference to FIG. 2.

The content module 106 can be configured to provide various types of content items that can be presented to users through the interface provided by the interface module 104. The content items provided by the content module 106 may be categorized into one or more categories and/or be associated with one or more content feeds (e.g., channels). Further, each content feed may be associated with a particular topic, theme, and/or entity (e.g., content publisher), to name some examples. Users can access and/or subscribe to one or more different content feeds to access the different content items that are included in the respective content feeds. In some embodiments, a user can access a content feed (e.g., news feed) that is customized for the user. More details regarding the content module 106 will be provided below in reference to FIG. 3.

Figure 2:
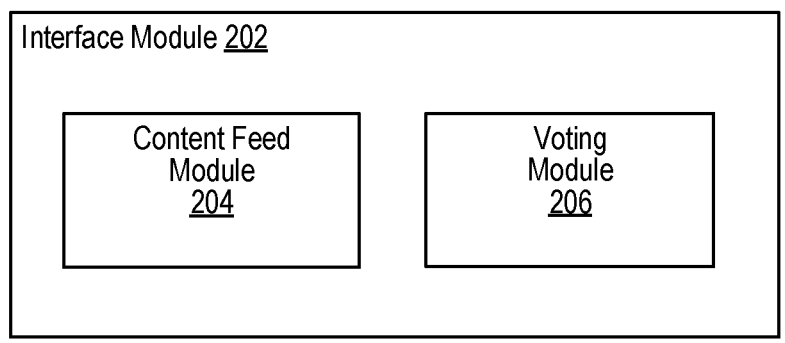
FIG. 2 illustrates an example of an interface module configured to provide an interface for accessing content items, according to an embodiment of the present disclosure.

FIG. 2 illustrates an example of an interface module 202 configured to provide an interface for accessing content items, according to an embodiment of the present disclosure. In some embodiments, the interface module 104 of FIG. 1 can be implemented with the interface module 202. As shown in the example of FIG. 2, the interface module 202 can include a content feed module 204 and a voting module 206. As mentioned, the interface module 202 can be configured to provide an interface (e.g., graphical user interface) through which content items (e.g., images, videos, audio files, etc.) can be presented and accessed. In various embodiments, the interface module 202 can utilize a content feed module 204 that is configured to organize and present the content items in one or more content feeds. The content items included in the content feed, as well as the order in which the content items are presented in the content feed, can be determined by the content module 302 as described in reference to FIG. 3. In some implementations, a user can browse the different content items included in a content feed, for example, by scrolling and/or performing gestures (e.g., scroll gestures) to move the content feed up or down (or some other directions that facilitate browsing, such as left or right).

In various embodiments, the voting module 206 can provide a respective set of feedback options for each content item included in a content feed. The feedback options for a content item can be utilized by users to provide feedback for the content item. In some embodiments, the voting module 206 can provide, for each content item included in a content feed, a respective "up-vote" or "like" option and a respective "down-vote" or "dislike" option. In one example, these options can be presented visually through the interface, for example, as a set of buttons (e.g., a thumbs-up button to up-vote and a thumbs-down button to down-vote). Users that access, or browse, a content item or a snippet of the content item, can utilize the options to indicate whether they liked or disliked the content item. The voting module 206 can track the number of up-votes and down-votes that are received from users for any given content item. Further, for any given user, the voting module 206 can determine the number of up-votes and down-votes received from that user for a content item. The number of up-votes and down-votes received for a content item can be displayed to users through the interface. As mentioned, in some embodiments, content items included in the content feed can each be associated with a respective lifespan. In such embodiments, the number of up-votes and down-votes received for a content item can be used to determine, or adjust, the lifespan and/or ranking for the content item, as described in reference to FIG. 3.

Figure 3:
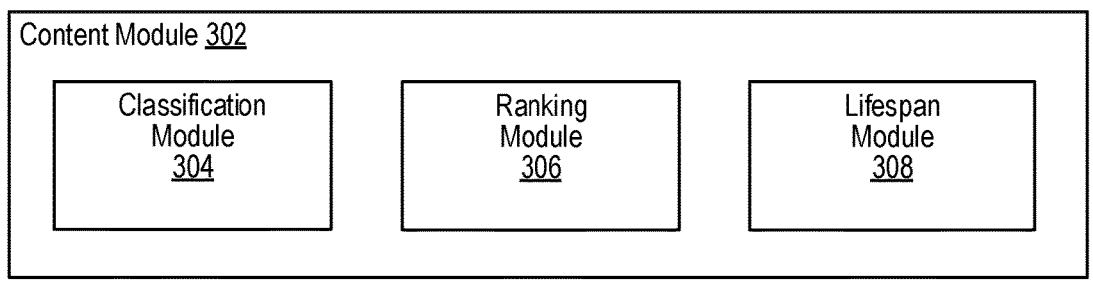
FIG. 3 illustrates an example of a content module configured to provide content items, according to an embodiment of the present disclosure.

FIG. 3 illustrates an example of a content module 302 configured to provide content items, according to an embodiment of the present disclosure. In some embodiments, the content module 106 of FIG. 1 can be implemented with the content module 302. As shown in the example of FIG. 3, the content module 302 can include a classification module 304, a ranking module 306, and a lifespan module 308. In various embodiments, the content module 302 can provide content items for display to a user, for example, in a content feed. In some embodiments, the content feed can be managed by a social networking system that can select content items (or stories) for presentation to the user. Such content items may be selected from various content items that may be provided (e.g., uploaded or shared) by other users of the social networking system or by various third-party content publishers, for example.

In various embodiments, content items can be analyzed by the classification module 304. The classification module 304 can perform a classification analysis on content items, or portions of the content items (e.g., text, images, video, audio, etc.), to determine the subject matter captured by the content items. The classification module 304 can perform the classification analysis by applying a machine learning model (classifier) to a content item. In particular, the classification module 304 can determine a probability regarding whether the content item reflects predetermined subject matter. The classifier can be based on any machine learning technique, including, but not limited to, a convolutional neural network. The classifier supported by the classification module 304 can be trained and tested to determine the subject matter reflected by a content item. In a development phase, contextual cues for a sample set of content items can be gathered. Classes, or categories, corresponding to various subject matter can be determined. Correlation of the sample set of content items with the classes based on the contextual cues can be determined. A training set of content items can be generated from the sample set of content items based on scores indicative of high correlation. The training set of content items can be used to train the classifier to generate pattern templates of the classes. In an evaluation phase, the classifier can be applied to a new content item to determine the subject matter reflected by the new content item. In various embodiments, the classification module 304 can receive a content item as input and can provide, as output, a set of tags associated with the content item. Each tag can identify some subject matter that was determined to be in the content item.

The ranking module 306 can be configured to rank content items that are active (i.e., content items whose respective lifespan has not expired) in the social networking system so that user content feeds include content items that are determined to be relevant, or of interest, to the users. As mentioned, users of the social networking system can each have a respective content feed (e.g., news feed) that is customized for the user. At any given time, the social networking system may have a large number of active content items that are available for presentation in user content feeds. To filter this large number of content items for a specific user's content feed, the ranking module 306 can train (and retrain) machine learning models to rank active content items, for example, based on the user's interests and/or voting patterns. In some embodiments, the content module 106 can generate a single model that applies to all users of the social networking system. In such embodiments, a model can be trained using training examples that each include, as input, a user identifier and a set of tags associated with a content item for which the user provided a vote. Further, each training example can also include a corresponding desired output that indicates whether the user up-voted or down-voted the content item.

When a content item is to be ranked for a user's content feed, the ranking module 306 can obtain any tags associated with the content item, as determined by the classification module 304, and can input these tags along with the user's identifier into the model to predict whether the user is likely to up-vote or down-vote the content item. In various embodiments, a content item that the ranking module 306 predicts will be up-voted by the user can be ranked higher in the user's content feed than content items that are predicted to be down-voted by the user or other content items for which the prediction is uncertain. In some embodiments, the content module 106 can divide its users into different sets based on various attributes of the users (e.g., age, demographics, interests, language, etc.) and can generate respective models for each set of users. Thus, different models can be utilized for ranking active content items depending on the user and their respective attributes.

The lifespan module 308 can be configured to determine, or adjust, the lifespan for content items. As mentioned, each content item can be associated with a default lifespan. This lifespan may be increased or decreased, for example, based on the number of users that indicated their like or dislike of the content item. In some embodiments, users can indicate their like or dislike of a content item by selecting options to up-vote or down-vote the content item, respectively. Thus, the lifespan of a content item can increase with respect to the number of up-votes, or likes, received for the content item. Similarly, the lifespan of the content item can decrease with respect to the number of down-votes, or dislikes, received for the content item. The amount of lifespan that is increased or decreased for a given content item can vary depending on the implementation. In one example, the amount of lifespan that is increased or decreased may be based on a set amount of time (e.g., increase lifespan by 30 seconds or decrease lifespan by 30 seconds).

In some instances, a content item may receive a large number of up-votes or down-votes. In such instances, rather than increasing or decreasing the content item's lifespan in proportion to the large number of up-votes or down-votes (e.g., linearly), the increase or decrease of the content item's lifespan can be dampened or performed marginally (e.g., non-linearly) to prevent the content item from having an excessive lifespan or to prevent the content item from expiring prematurely. In some embodiments, the weight assigned to a user's vote (e.g., up-vote and/or down-vote) can be adjusted. For example, the weight assigned to votes of users that perform an excessive amount of up-votes (e.g., based on a threshold number or rate) or an excessive amount of down-votes (e.g., based on a threshold number or rate) of content items can be reduced, since such users have demonstrated to be overzealous in liking or disliking content items. In contrast, the weight assigned to the votes of users that perform a moderate amount of up-votes or down-votes (e.g., based on a threshold number or rate) of content items can be increased, since such users have demonstrated to be more judicious in liking or disliking content items.

Figure 4:
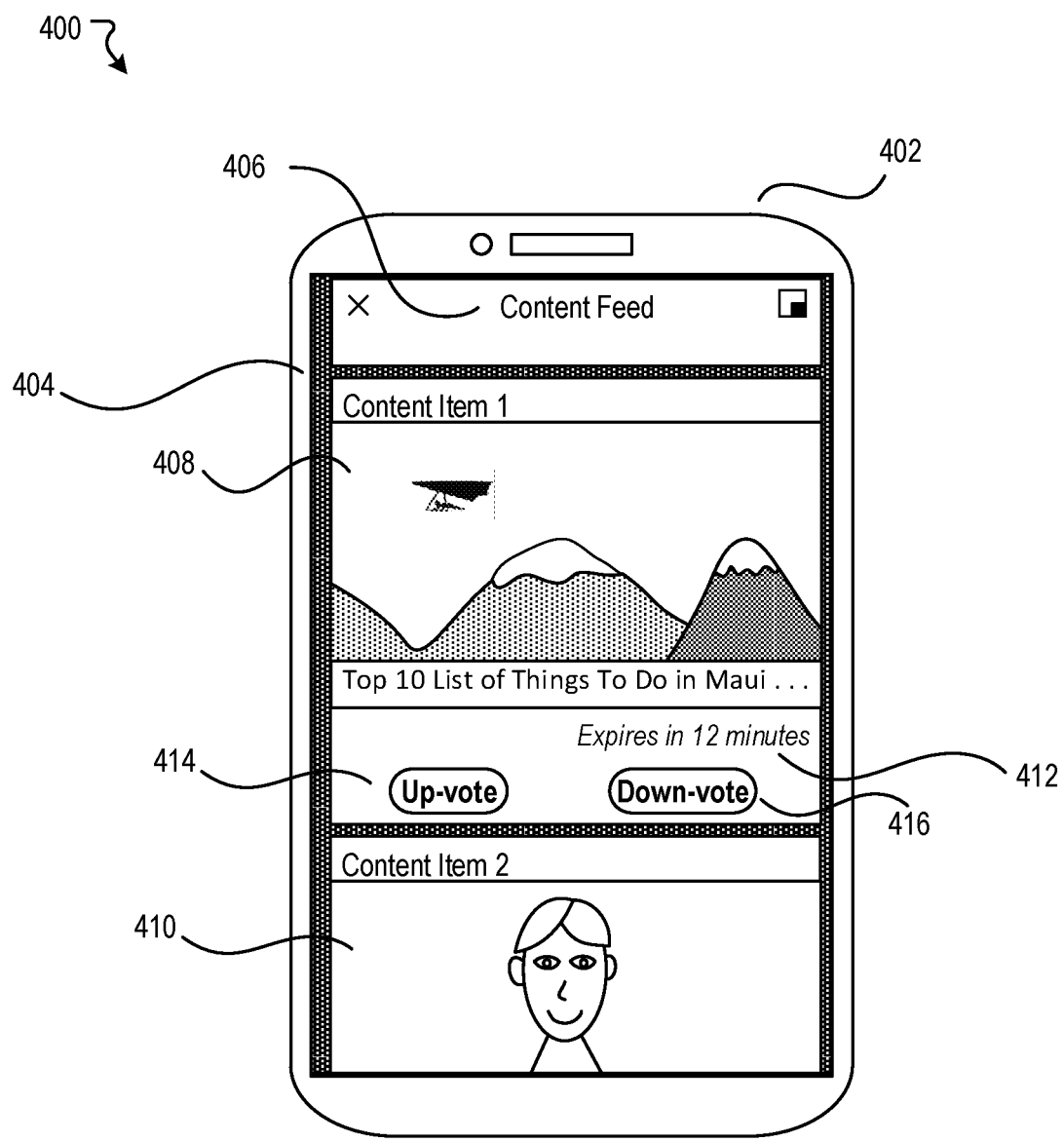
FIG. 4 illustrates an example of an interface through which content items are presented in a content feed based on respective lifespans, according to an embodiment of the present disclosure.

FIG. 4 illustrates an example 400 of the interface 404 through which content items are being presented in a content feed 406, according to an embodiment of the present disclosure. In this example, the interface 404 is presented on a display screen of the computing device 402. Further, the interface 404 may be provided through an application (e.g., a web browser, a social networking application, etc.) running on the computing device 402. In FIG. 4, the content feed 406 includes various active content items 408, 410 that are each associated with a respective lifespan. In this example, the content items 408, 410 will be removed from the content feed 406 once the respective lifespans for these content items expire. The interface 404 can provide a respective set of voting options for each content item included in the content feed. In the example of FIG. 4, the content item 408 is associated with an up-vote option 414 and a down-vote option 416. In this example, a lifespan 412 (e.g., "expires in 12 minutes") corresponding to the content item 408 is shown. The user operating the computing device 402 can up-vote 414 or down-vote 416 the content item 408. The up-votes and down-votes received for content items by users of the social networking system can cause the respective lifespan of the content item to be adjusted. In some embodiments, the up-vote or down-vote provided by the user for the content item 408 can be used to rank subsequent content items in the content feed 406, as described above.

Figure 5:
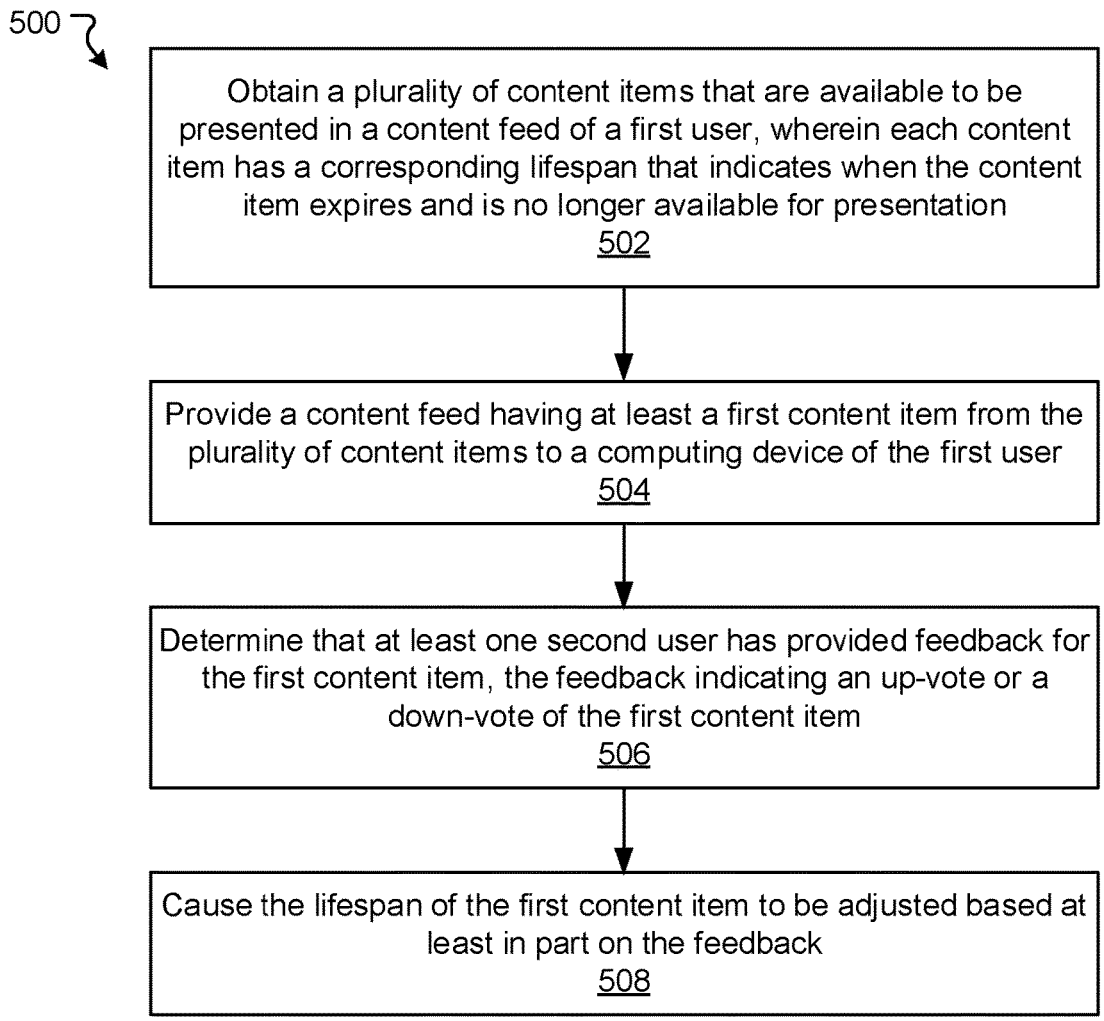
FIG. 5 illustrates an example method for providing content items based on respective lifespans, according to an embodiment of the present disclosure.

FIG. 5 illustrates an example method 500 for providing content items based on respective lifespans, according to an embodiment of the present disclosure. It should be appreciated that there can be additional, fewer, or alternative steps performed in similar or alternative orders, or in parallel, within the scope of the various embodiments discussed herein unless otherwise stated. At block 502, the example method 500 can obtain a plurality of content items that are available to be presented in a content feed of a first user, wherein each content item has a corresponding lifespan that indicates when the content item expires and is no longer available for presentation. At block 504, content feed having at least a first content item from the plurality of content items can be provided to a computing device of the first user. At block 506, a determination can be made that at least one second user has provided feedback for the first content item, the feedback indicating an up-vote or a down-vote of the first content item. At block 508, the lifespan of the first content item can be adjusted based at least in part on the feedback.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
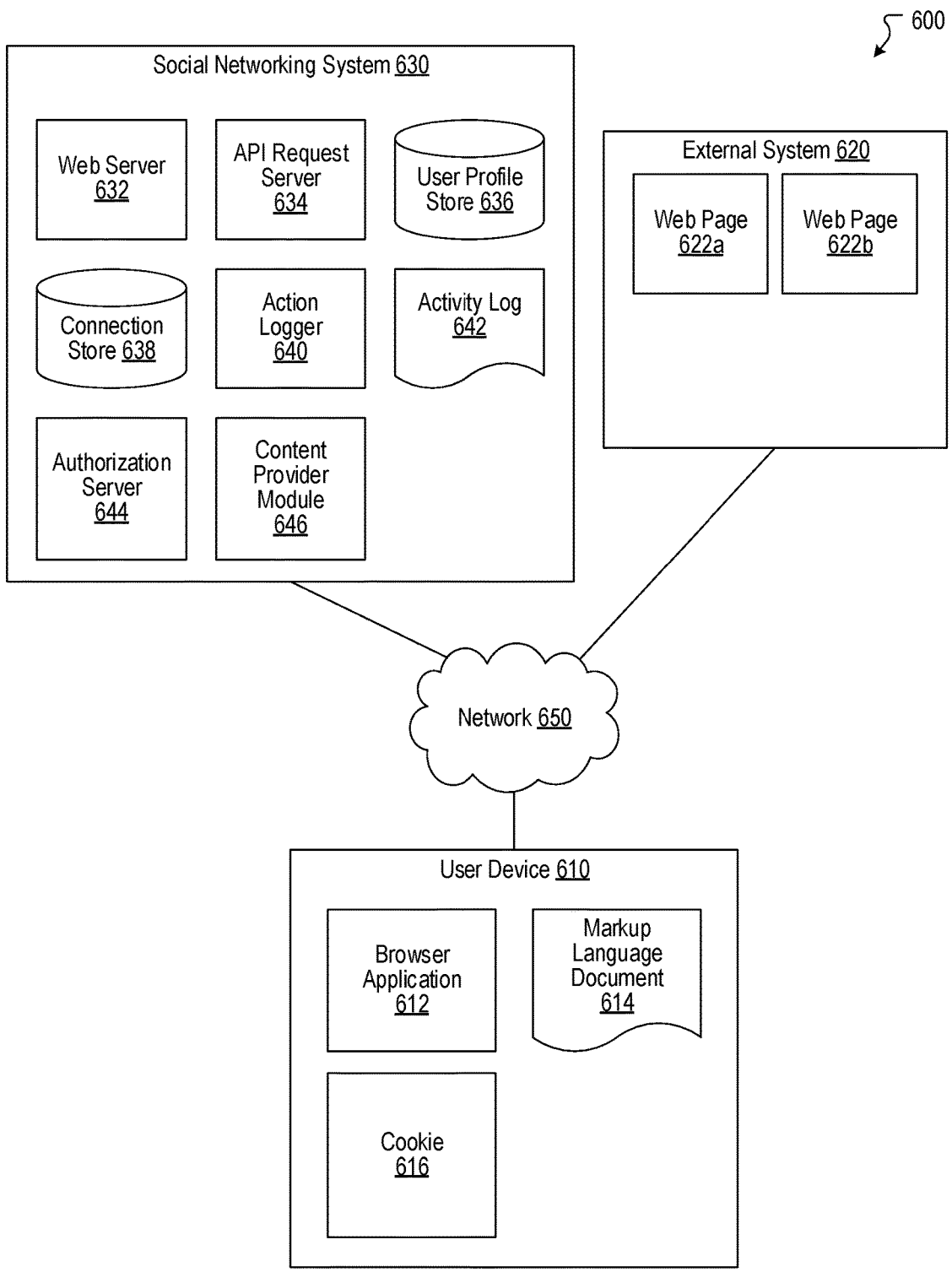
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. As discussed previously, it should be appreciated that there can be many variations or other possibilities.

Hardware Implementation

Figure 7:
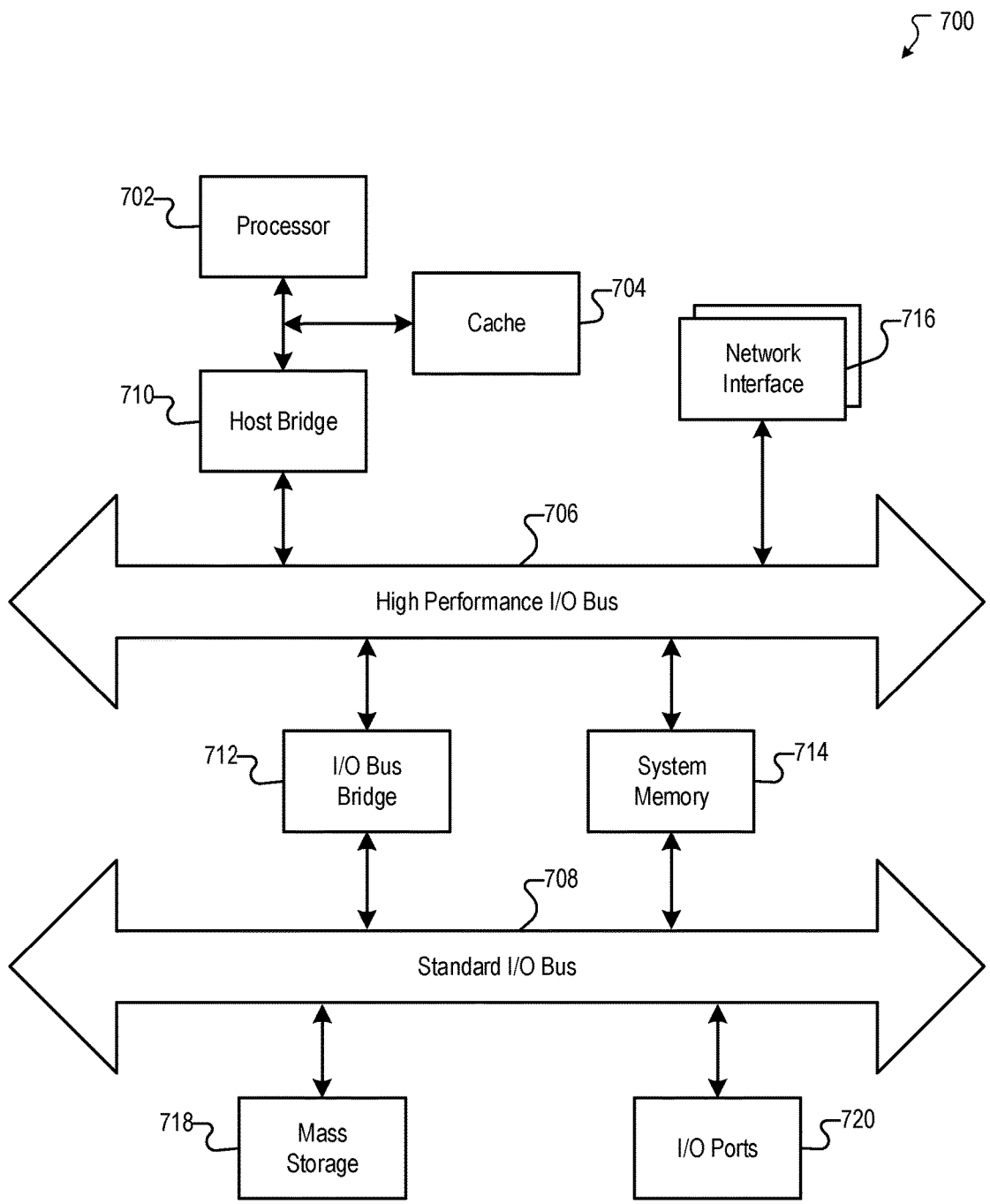
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, a plurality of content items that are available to be presented in a content feed of a first user, wherein each content item has a corresponding lifespan that indicates when the content item expires and is no longer available for presentation;
    providing, by the computing system, the content feed having at least a first content item from the plurality of content items to a computing device of the first user;
    determining, by the computing system, that at least one second user has provided second feedback for the first content item, the second feedback indicating an up-vote or a down-vote of the first content item;
    adjusting, by the computing system, a weight associated with the second user to assign to the second feedback, wherein the weight is adjusted based on past instances of feedback by the second user;
    causing, by the computing system, the lifespan of the first content item to be adjusted based at least in part on the second feedback and the weight;
    obtaining, by the computing system, a first set of tags associated with the first content item, each tag describing subject matter in the first content item; and
    determining, by the computing system, a ranking for the first content item in the content feed of the first user based at least in part on the first set of tags and an identifier associated with the first user using a machine learning model.

2. The computer-implemented method of claim 1, wherein the second feedback indicates an up-vote, and wherein causing the lifespan associated with the first content item to be adjusted further comprises:
    causing, by the computing system, the lifespan of the first content item to be increased.

3. The computer-implemented method of claim 1, wherein the second feedback indicates a down-vote, and wherein causing the lifespan associated with the first content item to be adjusted further comprises:
    causing, by the computing system, the lifespan of the first content item to be decreased.

4. The computer-implemented method of claim 1, the method further comprising:
    receiving, by the computing system, first feedback for the first content item provided by the first user, the first feedback indicating an up-vote or a down-vote of the first content item; and
    causing, by the computing system, the lifespan of the first content item to be adjusted based at least in part on the first feedback from the first user.

5. The computer-implemented method of claim 4, the method further comprising:
    training, by the computing system, a model to be used for ranking content items based at least in part on (i) the set of tags and (ii) the first feedback provided by the first user for the first content item.

6. The computer-implemented method of claim 5, the method further comprising:
    determining, by the computing device, a second content item to be included in the content feed;
    obtaining, by the computing system, a second set of tags associated with the second content item, each tag describing subject matter in the second content item; and
    determining, by the computing system, a ranking for the second content item in the content feed of the first user using the trained model.

7. The computer-implemented method of claim 1, the method further comprising:
    determining, by the computing system, that the lifespan of the first content item has expired; and
    removing, by the computing system, the first content item from the content feed.

8. The computer-implemented method of claim 7, wherein removing the first content item from the content feed further comprises:
    removing, by the computing system, the first content item from a content feed corresponding to the second user.

9. The computer-implemented method of claim 1, wherein an amount of adjustment to the lifespan of the first content item is based at least in part on a feedback history of the second user.

10. The computer-implemented method of claim 1, wherein the weight is adjusted non-linearly.

11. A system comprising:
    at least one processor; and
    a memory storing instructions that, when executed by the at least one processor, cause the system to perform:
        obtaining a plurality of content items that are available to be presented in a content feed of a first user, wherein each content item has a corresponding lifespan that indicates when the content item expires and is no longer available for presentation;
        providing the content feed having at least a first content item from the plurality of content items to a computing device of the first user;
        determining that at least one second user has provided second feedback for the first content item, the second feedback indicating an up-vote or a down-vote of the first content item;
        adjusting a weight associated with the second user to assign to the second feedback, wherein the weight is adjusted based on past instances of feedback by the second user;
        causing the lifespan of the first content item to be adjusted based at least in part on the second feedback and the weight;
        obtaining a first set of tags associated with the first content item, each tag describing subject matter in the first content item; and
        determining a ranking for the first content item in the content feed of the first user based at least in part on the first set of tags and an identifier associated with the first user using a machine learning model.

12. The system of claim 11, wherein the second feedback indicates an up-vote, and wherein causing the lifespan associated with the first content item to be adjusted further causes the system to perform:
    causing the lifespan of the first content item to be increased.

13. The system of claim 11, wherein the second feedback indicates a down-vote, and wherein causing the lifespan associated with the first content item to be adjusted further causes the system to perform:
    causing the lifespan of the first content item to be decreased.

14. The system of claim 11, wherein the instructions further cause the system to perform:
    receiving first feedback for the first content item provided by the first user, the first feedback indicating an up-vote or a down-vote of the first content item; and causing the lifespan of the first content item to be adjusted based at least in part on the first feedback from the first user.

15. The system of claim 12, wherein the weight is adjusted non-linearly.

16. A non-transitory computer-readable storage medium including instructions that, when executed by at least one processor of a computing system, cause the computing system to perform a method comprising:
- obtaining a plurality of content items that are available to be presented in a content feed of a first user, wherein each content item has a corresponding lifespan that indicates when the content item expires and is no longer available for presentation;
- providing the content feed having at least a first content item from the plurality of content items to a computing device of the first user;
- determining that at least one second user has provided second feedback for the first content item, the second feedback indicating an up-vote or a down-vote of the first content item;
- adjusting a weight associated with the second user to assign to the second feedback, wherein the weight is adjusted based on past instances of feedback by the second user;
- causing the lifespan of the first content item to be adjusted based at least in part on the second feedback and the weight;
- obtaining a first set of tags associated with the first content item, each tag describing subject matter in the first content item; and
- determining a ranking for the first content item in the content feed of the first user based at least in part on the first set of tags and an identifier associated with the first user using a machine learning model.

17. The non-transitory computer-readable storage medium of claim 16, wherein the second feedback indicates an up-vote, and wherein causing the lifespan associated with the first content item to be adjusted further causes the computing system to perform:
- causing the lifespan of the first content item to be increased.

18. The non-transitory computer-readable storage medium of claim 16, wherein the second feedback indicates a down-vote, and wherein causing the lifespan associated with the first content item to be adjusted further causes the computing system to perform:
- causing the lifespan of the first content item to be decreased.

19. The non-transitory computer-readable storage medium of claim 16, wherein the instructions further cause the computing system to perform:
- receiving first feedback for the first content item provided by the first user, the first feedback indicating an up-vote or a down-vote of the first content item; and
- causing the lifespan of the first content item to be adjusted based at least in part on the first feedback from the first user.

20. The non-transitory computer-readable storage medium of claim 16, wherein the weight is adjusted non-linearly.

* * * * *